(12) United States Patent
Guice et al.

(10) Patent No.: US 11,891,322 B2
(45) Date of Patent: Feb. 6, 2024

(54) MOBILE CLEANING AND WATER TREATMENT SYSTEM

(71) Applicant: CLEANSTREAK SURFACE CLEANING, LLC, Huntersville, NC (US)

(72) Inventors: Cameron C. Guice, Charlotte, NC (US); Jonathan L. Greene, Charlotte, NC (US)

(73) Assignee: CLEANSTREAK SURFACE CLEANING, LLC, Huntersville, NC (US)

( * ) Notice: Subject to any disclaimer, the term of this patent is extended or adjusted under 35 U.S.C. 154(b) by 161 days.

(21) Appl. No.: 17/507,955

(22) Filed: Oct. 22, 2021

(65) Prior Publication Data
US 2023/0128898 A1   Apr. 27, 2023

(51) Int. Cl.
*C02F 9/00* (2023.01)
*B08B 13/00* (2006.01)
(Continued)

(52) U.S. Cl.
CPC .............. *C02F 9/00* (2013.01); *B05B 9/0426* (2013.01); *B05B 13/005* (2013.01); *B08B 3/024* (2013.01);
(Continued)

(58) Field of Classification Search
CPC .. C02F 9/00; C02F 1/008; C02F 1/001; C02F 1/5281; C02F 1/56; C02F 11/121;
(Continued)

(56) References Cited

U.S. PATENT DOCUMENTS 3,399,133 A  *  8/1968  Gerdes ............... G01N 15/0656
                                              73/61.41
3,687,156 A  *  8/1972  Minich, Jr. ............. B60S 3/047
                                              137/334
(Continued)

FOREIGN PATENT DOCUMENTS

FR            3050467 A1     10/2017
JP            H0847698 A      2/1996
                   (Continued)

*Primary Examiner* — Joseph W Drodge
(74) *Attorney, Agent, or Firm* — Moore & Van Allen PLLC; Michael M. McCraw (57) ABSTRACT

A mobile power washing system is provided. The system includes a mobile instant reclaim cleaning unit, a mobile water treatment vehicle operably coupled to the mobile instant reclaim cleaning unit, and a controller. The mobile instant reclaim cleaning unit includes an instant reclaim drivable vehicle and one or more high pressure cleaning heads disposed on the instant reclaim drivable vehicle. The mobile water treatment vehicle includes a drivable vehicle, a water treatment unit, a water treatment unit disposed on the drivable vehicle, at least one water tank operably coupled to the water treatment unit and disposed on the drivable vehicle, at least one water pump disposed on the drivable vehicle and configured to pump water from the at least one water tank to the mobile instant reclaim cleaning unit and a power source configured to power the at least one water pump.

8 Claims, 7 Drawing Sheets

(51) Int. Cl.
*B05B 13/00* (2006.01)
*B05B 9/04* (2006.01)
*B60P 3/22* (2006.01)
*B08B 3/02* (2006.01)
*C02F 1/52* (2023.01)
*C02F 1/56* (2023.01)
*C02F 1/00* (2023.01)
*C02F 11/121* (2019.01)

(52) U.S. Cl.
CPC ............. *B08B 13/00* (2013.01); *B60P 3/225* (2013.01); *B60P 3/2265* (2013.01); *C02F 1/008* (2013.01); *B08B 2203/027* (2013.01); *C02F 1/001* (2013.01); *C02F 1/5281* (2013.01); *C02F 1/56* (2013.01); *C02F 11/121* (2013.01); *C02F 2001/007* (2013.01); *C02F 2201/008* (2013.01); *C02F 2209/005* (2013.01); *C02F 2209/11* (2013.01); *C02F 2301/046* (2013.01)

(58) Field of Classification Search
CPC .......... C02F 2001/007; C02F 2201/008; C02F 2209/005; C02F 2209/11; C02F 2301/046; C02F 1/444; C02F 11/12; C02F 1/004; C02F 2201/009; C02F 1/52; C02F 1/44; C02F 1/5209; C02F 1/685; C02F 1/686; C02F 1/687; C02F 2001/008; C02F 2201/007; B05B 9/0426; B05B 13/005; B08B 3/024; B08B 13/00; B08B 2203/027; B60P 3/225; B60P 3/2265; A47L 11/00; E01H 1/10
See application file for complete search history.

(56) References Cited

U.S. PATENT DOCUMENTS

| | | | |
|---|---|---|---|
| 3,748,050 A * | 7/1973 | Poppitz | A47L 11/38 401/289 |
| 3,753,777 A | 8/1973 | Thomsen et al. | |
| 4,046,686 A * | 9/1977 | Goldstein | C02F 9/00 210/652 |
| 4,277,343 A * | 7/1981 | Paz | C02F 1/008 210/906 |
| 4,536,286 A | 8/1985 | Nugent | |
| 5,055,184 A * | 10/1991 | Carpenter | C02F 1/24 210/221.2 |
| 5,500,976 A * | 3/1996 | Rohrbacher | B05B 3/001 15/353 |
| 5,647,977 A * | 7/1997 | Arnaud | C02F 9/00 210/207 |
| 5,718,015 A | 2/1998 | Rohrbacher | |
| 5,826,298 A * | 10/1998 | Rohrbacher | E01H 1/103 15/340.1 |
| 5,958,240 A * | 9/1999 | Hoel | B01D 21/2427 210/708 |
| 5,979,012 A | 11/1999 | Fritz | |
| 6,514,354 B2 | 2/2003 | Rohrbacher et al. | |
| 6,578,714 B2 | 6/2003 | Rohrbacher et al. | |
| 8,061,373 B1 | 11/2011 | Storms | |
| 8,357,292 B2 | 1/2013 | Crocker | |
| 8,763,929 B2 | 7/2014 | Llopiz-Capote et al. | |
| 9,260,086 B1 * | 2/2016 | Normand, Jr. | C02F 1/24 210/221.2 |
| 10,029,922 B2 | 7/2018 | Segroves et al. | |
| 11,065,651 B1 * | 7/2021 | Awad | B08B 3/024 |
| 2004/0262206 A1* | 12/2004 | Gettman | B01D 17/045 210/182 |
| 2006/0027253 A1* | 2/2006 | Kaiser | B08B 3/026 134/108 |
| 2007/0158276 A1* | 7/2007 | Markle | C02F 1/32 210/202 |
| 2010/0108781 A1* | 5/2010 | Terrizzi | B62B 5/06 239/525 |
| 2010/0206786 A1* | 8/2010 | Fukuda | C02F 1/5236 210/202 |
| 2011/0131752 A1* | 6/2011 | Place | C02F 1/5236 210/202 |
| 2012/0312755 A1 | 12/2012 | Ryan et al. | |
| 2013/0193231 A1* | 8/2013 | Mologousis | B08B 3/08 239/172 |
| 2016/0225062 A1 | 8/2016 | Inman et al. | |
| 2022/0097105 A1* | 3/2022 | Christopher | B60S 3/00 |

FOREIGN PATENT DOCUMENTS

| | | |
|---|---|---|
| JP | 3376707 | 2/2003 |
| JP | 6008807 B2 | 10/2016 |
| WO | 2020169722 A1 | 8/2020 |

* cited by examiner

MOBILE CLEANING AND WATER TREATMENT SYSTEM

FIELD

The presently-disclosed invention relates generally to cleaning and water treatment systems and methods and, more particularly, to systems and methods for providing mobile power washing and onsite water treatment.

BACKGROUND

Hard horizontal surfaces (e.g., asphalt, concrete, etc.) require regular cleaning to remove dirt and toxins. However, present systems and methods of surface cleaning are a patchwork of incohesive systems and methods that are unable to provide comprehensive surface cleaning in a cost effective and environmentally compliant manner.

Indeed, many municipalities and other governing bodies have environmental standards for disposal of wastewater generated from surface cleaning because the wastewater may include excessive quantities of heavy metals, oil, grease, bacteria, toxic solids, and oxygen-consuming organic matter. As a result, many municipalities and other governing bodies require that the wastewater generated from surface cleaning be "reclaimed" so the wastewater does not run off into a municipality's drainage system (e.g., sanitary and/or stormwater systems) or other governing bodies' drainage system. However, the requirement to reclaim the wastewater generated from surface cleaning increases the cost of surface cleaning, and existing surface cleaning systems do not meet the environment standards for disposal. In particular, the reclaimed wastewater must be taken to an off-site location for professional water treatment, or, if the water treatment is performed on-site, the necessary cleaning system is impractical to operate in the constrained areas requiring surface cleaning.

Accordingly, there is a need for systems and methods that provide a comprehensive solution to surface cleaning in a cost effective and environmentally compliant manner. This may be accomplished, for example, by providing systems and methods that enable cleaning of constrained areas of surfaces and onsite treatment of reclaimed wastewater such that, once treated, the wastewater may either be reused in surface cleaning or directly disposed of into a municipality's drainage system or other governing bodies' drainage system.

BRIEF SUMMARY

One or more embodiments of the invention may address one or more of the aforementioned problems. Certain embodiments according to the invention provide systems and methods for providing mobile power washing (e.g. for surface cleaning) in a cost effective and environmentally compliant manner. In particular, according to a first aspect, a mobile power washing system is provided. The mobile power washing system comprises a mobile instant reclaim cleaning unit, a mobile water treatment vehicle operably coupled to the mobile instant reclaim cleaning unit, and a controller configured to control operation of the mobile instant reclaim cleaning unit and the mobile water treatment vehicle and communication between the mobile instant reclaim cleaning unit and the mobile water treatment vehicle. The mobile instant reclaim cleaning unit includes an instant reclaim drivable vehicle, and one or more high pressure cleaning heads disposed on the instant reclaim drivable vehicle. The mobile water treatment vehicle includes a drivable vehicle, a water treatment unit disposed on the drivable vehicle, at least one water tank operably coupled to the water treatment unit and disposed on the drivable vehicle, at least one water pump disposed on the drivable vehicle and configured to pump water from the at least one water tank to the mobile instant reclaim cleaning unit, and a power source configured to power the at least one water pump.

According to certain embodiments, the mobile instant reclaim cleaning unit and the mobile water treatment vehicle may be connected via a high pressure water hose and a reclaim hose, the high pressure water hose being configured to supply clean water from the at least one water tank of the mobile water treatment vehicle to the mobile instant reclaim cleaning unit for cleaning, and the reclaim hose being configured to supply contaminated water from the mobile instant reclaim cleaning unit to the at least one water tank of the mobile water treatment vehicle after cleaning.

According to certain embodiments, each of the one or more high pressure cleaning heads may comprise a plurality of nozzles configured to deliver high pressure water to a surface and one or more spinning rotor arms configured to generate negative pressure to lift dirt and reclaim water from the surface.

According to certain embodiments, the drivable vehicle may comprise a transport chassis.

According to certain embodiments, the water treatment unit may comprise at least one flocculator; a dosing unit operably coupled to the flocculator, wherein the dosing unit is configured to inject one or more coagulants and/or one or more flocculants into water being treated in the at least one flocculator; a clarifier and/or a solids separator vessel operably coupled to the at least one flocculator; a streaming current detector operably coupled to the clarifier and/or the solids separator vessel; and at least a first filtration media and a second filtration media, wherein the first filtration media is operably coupled to the streaming current detector, the second filtration media is operably coupled to the first filtration media and the at least one water tank, and a filter size of the first filtration media is larger than a filter size of the second filtration media. In some embodiments, the water treatment unit may further comprise dewatering media operably coupled to the clarifier and/or the solids separator vessel, the dewatering media being configured to process sludge pumped from the clarifier and/or the solids separator vessel.

According to certain embodiments, the power source may comprise electrical power, pneumatic power, and hydraulic power generated by a powertrain system of the drivable vehicle.

According to certain embodiments, the controller may comprise a programmable logic controller (PLC).

In another aspect, an onsite water treatment unit is provided. The onsite water treatment unit comprises at least one flocculator; a dosing unit operably coupled to the flocculator, wherein the dosing unit is configured to inject at least one coagulant and/or at least one flocculant into water being treated in the at least one flocculator; a clarifier and/or a solids separator vessel operably coupled to the at least one flocculator; and at least a first filtration media and a second filtration media, wherein the first filtration media is operably coupled to the clarifier and/or the solids separator vessel, the second filtration media is operably coupled to the first filtration media and the at least one water tank, and a filter size of the first filtration media is larger than a filter size of the second filtration media.

According to certain embodiments, the at least one flocculant may comprise an anionic polymer flocculant.

According to certain embodiments, a filter size of the first filtration media may be from 50 μm to 100 μm. In some embodiments, a filter size of the second filtration media may be from 5 μm to 25 μm.

According to certain embodiments, the onsite water treatment unit may further comprise dewatering media operably coupled to the clarifier and/or the solids separator vessel, the dewatering media being configured to process sludge pumped from the clarifier and/or the solids separator vessel. In some embodiments, the onsite water treatment unit may further comprise a streaming current detector operably coupled to the clarifier and/or the solids separator vessel and being configured to monitor electrical charge and turbidity of water being treated by the onsite water treatment unit. In further embodiments, the onsite water treatment unit may further comprise a metering tank operably coupled to the at least one flocculator and being configured to receive contaminated water into the onsite water treatment unit, wherein the metering tank comprises a filtration media configured to capture debris present in the contaminated water.

In yet another aspect, a method for onsite water treatment and disposal is provided. The method comprises pumping contaminated water through flocculators and/or at least one mixing tank to provide flocculator-treated water; injecting at least one coagulant and/or at least one flocculant into the flocculator-treated water to provide dosed water; running the dosed water through a clarifier and/or a solids separator to provide separated clarified water and sludge; pumping the clarified water through a first filtration media to provide coarsely filtered water; and pumping the coarsely filtered water through a second filtration media to provide finely filtered water.

According to certain embodiments, a filter size of the first filtration media may be larger than a filter size of the second filtration media.

According to certain embodiments, the method may further comprise monitoring electrical charge and turbidity of the clarified water. In some embodiments, the method may further comprise pumping the sludge into dewatering media to provide dewatered sludge and processed contaminated water. In further embodiments, the method may further comprise disposing of the dewatered sludge in a landfill. In certain embodiments, the method may further comprise reusing the finely filtered water for onsite water treatment. In some embodiments, the method may further comprise disposing the finely filtered water in a drainage system.

In yet another aspect, a mobile instant reclaim cleaning unit is provided. The mobile instant reclaim cleaning unit comprises an instant reclaim drivable vehicle, one or more high pressure cleaning heads disposed on the instant reclaim drivable vehicle, a power source configured to power the instant reclaim drivable vehicle and the one or more high pressure cleaning heads, and a controller configured to control operation of the mobile instant reclaim cleaning unit.

According to certain embodiments, the mobile instant reclaim cleaning unit may be configured to be operably coupled to a high pressure water hose and a reclaim hose, the high pressure water hose being configured to supply clean water to the one or more high pressure cleaning heads for cleaning, and the reclaim hose being configured to remove contaminated water from the one or more high pressure cleaning heads.

According to certain embodiments, the power source may comprise a diesel engine configured to generate hydraulic power.

According to certain embodiments, each of the one or more high pressure cleaning heads may comprise a plurality of nozzles configured to deliver high pressure water to a surface and one or more spinning rotor arms configured to generate negative pressure to lift dirt and reclaim water from the surface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

Mobile Power Washing System

The invention includes, according to certain embodiments, systems and methods for providing mobile power washing (e.g. for surface cleaning) in a cost effective and environmentally compliant manner. In particular, a mobile power washing system 100 is provided. The mobile power washing system 100 includes a mobile instant reclaim cleaning unit 126 configured to perform mobile power washing on hard surfaces, including in constrained areas. The mobile instant reclaim cleaning unit 126 is further configured to reclaim wastewater (e.g. contaminated water) generated by the mobile power washing so that the wastewater does not runoff into a municipality's drainage system or other governing bodies' drainage system (e.g. sanitary and/or storm systems) and impact the environment. The mobile power washing system 100 further includes a mobile water treatment vehicle 102 configured to supply the mobile instant reclaim cleaning unit 126 with clean water for performing mobile power washing and treat the wastewater reclaimed by the mobile instant reclaim cleaning unit 126. As a result, the treated water may be reused for power washing and/or directly disposed into a municipality's drainage system or other governing bodies' drainage system, thus reducing the costs associated with mobile power washing of surfaces and reducing or preventing any impact to the environment.

With reference to FIGS. 1-6, a mobile power washing system 100 is illustrated configured to provide mobile power washing and water treatment. As described herein, embodiments of the mobile power washing system 100 may include a mobile water treatment vehicle 102 configured to provide a supply of water (e.g. clean water) and provide onsite treatment of contaminated water. As described herein, embodiments of the mobile power washing system 100 may include a mobile instant reclaim cleaning unit 126 configured to perform power washing and reclaim the water (e.g. contaminated water) used for power washing. As described herein, in some embodiments of the mobile power washing system 100, the mobile water treatment vehicle 102 and the mobile instant reclaim cleaning unit 126 may be operably coupled, such that the mobile water treatment vehicle 102 may supply clean water to the mobile instant reclaim cleaning unit 126, and the mobile instant reclaim cleaning unit 126 may supply contaminated water to the mobile water treatment vehicle 102.

Figure 1:
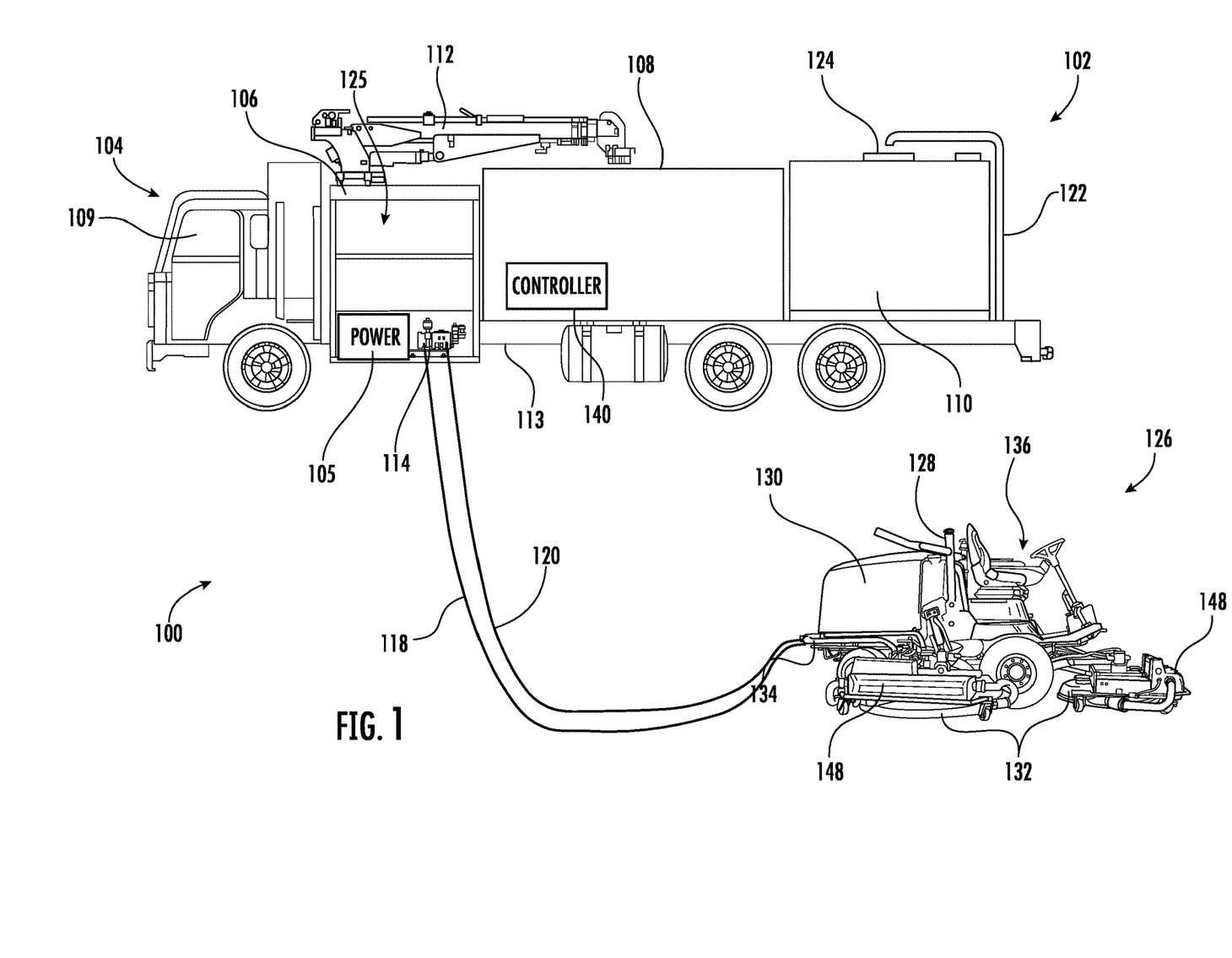
FIG. 1 illustrates a mobile power washing system in accordance with certain embodiments of the invention.

The mobile water treatment vehicle 102 may include a drivable vehicle 104 configured to transport components of the mobile water treatment vehicle 102 to a power washing site. In some embodiments, the mobile water treatment vehicle 102 may include at least one water pump 114. In some embodiments, the mobile water treatment vehicle 102, may include a water treatment unit 108 configured to treat contaminated water. In some embodiments, the mobile water treatment vehicle 102 may include at least one water tank 110 configured to store clean water and/or contaminated water. In some embodiments, the mobile water treatment vehicle 102 may include a power source 105 configured to power components of the mobile water treatment vehicle 102. In some embodiments, the mobile water treatment vehicle 102 may include a crane 112 configured to move components of the mobile power washing system 100. In some embodiments, the mobile water treatment vehicle 102 may include a controller 140 configured to control the operations of the mobile power washing system 100.

The drivable vehicle 104 may be any drivable vehicle capable of transferring the components of the mobile water treatment vehicle 102 to a power washing site. For example, as illustrated in FIG. 1, the drivable vehicle 104 may be a truck comprising a cabin 109 coupled to a transport chassis 113. As another example, the drivable vehicle 104 may be a truck coupled to a trailer upon which components of the mobile water treatment vehicle 102 may be disposed.

In some embodiments, at least one water tank 110 may be disposed on the drivable vehicle 104. The at least one water tank 110 may be configured to store clean water and/or contaminated water to enable mobile power washing and treatment. For example, in some embodiments the at least one water tank 110 may only be configured to store clean water. In other embodiments, however, the at least one water tank 110 may be configured to store both clean water and contaminated water. To do so, in some embodiments, the at least one water tank 110 may include one or more compartments. For example, one compartment may store clean water while another compartment may store contaminated water. In some embodiments, the at least one water tank 110 may include an input pipe 122 and an inlet 124 through which the at least one water tank 110 may be supplied with supply/makeup water (e.g. clean water from a fire hydrant). Additionally or alternatively, the inlet 124 may allow access to the interior of the at least one water tank 110, such as for cleaning or inspection. According to certain embodiments, the at least one water tank 110 may be capable of storing at least 300 gallons of water. For example, in some embodiments, the at least one water tank 110 may be capable of storing 2,000 to 3,000 gallons of water (e.g., at least 2,500 gallons of water).

In some embodiments, at least one water pump 114 may be disposed on the drivable vehicle 104. The at least one water pump 114 may be configured to pump water from the mobile water treatment vehicle 102 to the mobile instant reclaim cleaning unit 126 and/or through components of the mobile water treatment vehicle 102. Although FIG. 1 depicts an embodiment in which one pump is shown disposed on the drivable vehicle 104, one skilled in the art in view of this disclosure will understand that additional pumps may be used for facilitating the mobile power washing and treatment provided by the mobile power washing system 100. In some embodiments, a power source 105 may be disposed on the drivable vehicle 104 to power the at least one water pump 114. For example, the power source 105 may comprise electrical power, pneumatic power, mechanical power, and/or hydraulic power generated by a powertrain system of the drivable vehicle 104 and/or an auxiliary power source as understood by a person of ordinary skill in the art.

In some embodiments, the at least one water pump 114 and/or the power source 105 may be housed in a pump room 106 disposed on the drivable vehicle 104. In some embodiments, the pump room 106 may include a door 125. During the mobile power washing and treatment, the door 125 may be opened to allow access to the at least one water pump 114 and power source 105 and may be closed while the mobile water treatment vehicle 102 is in transport to protect the at least one water pump 114 and the power source 105 from damage.

Figure 2:
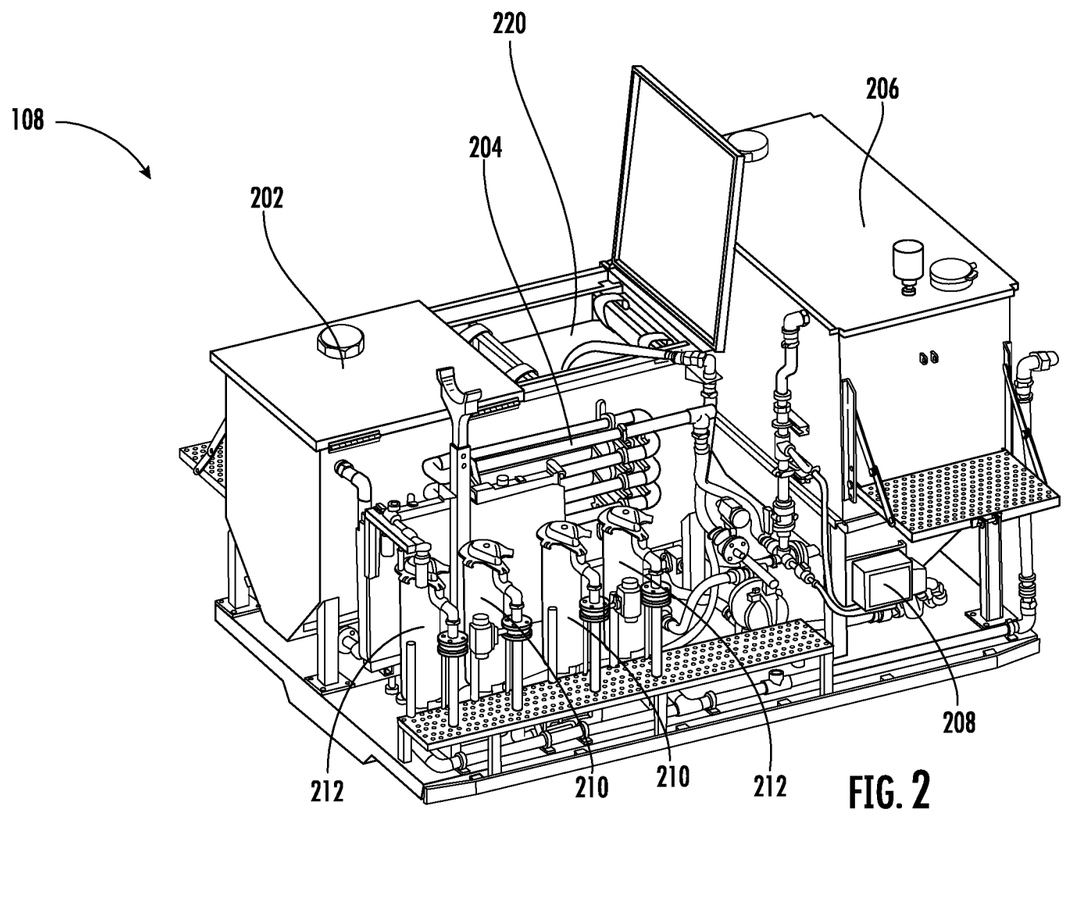
FIG. 2 illustrates a water treatment unit in accordance with certain embodiments of the invention.
Figure 3:
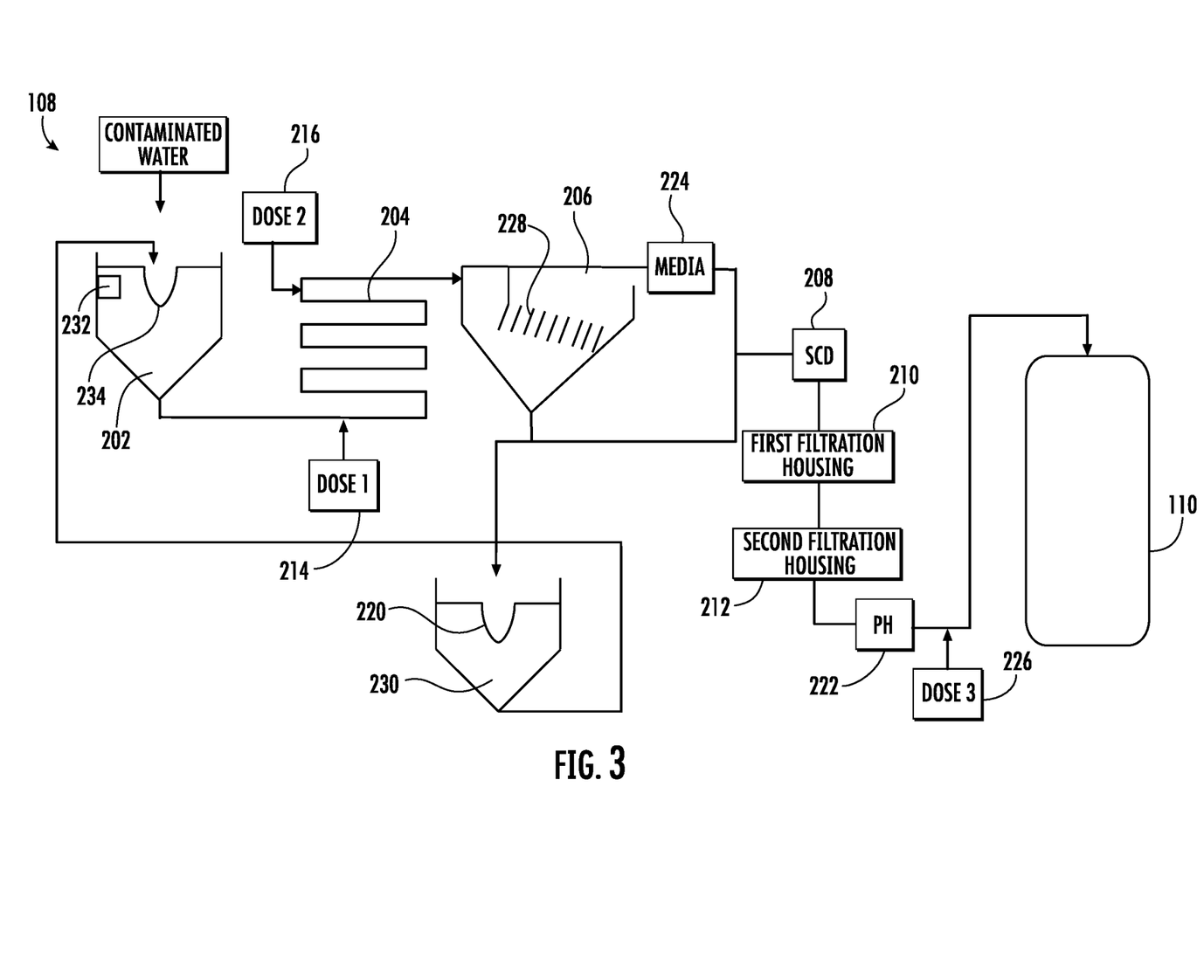
FIG. 3 is a schematic illustration of the water treatment unit in accordance with certain embodiments of the invention.

As illustrated in FIGS. 1-3, a water treatment unit 108 may be disposed on the drivable vehicle 104. While the water treatment unit 108 is described in the context of the mobile power washing system 100, the water treatment unit 108 is not so limited. Indeed, the water treatment unit 108 may be used in any suitable water treatment applications requiring clean water, particularly those involving environmental regulations, as understood by a person of ordinary skill in the art. The water treatment unit 108 may provide onsite treatment of contaminated water to convert it to clean water and meet environmental standards imposed by various municipalities or other governing bodies. The clean water, in some embodiments, may then be reused for mobile power washing. In other words, in some embodiments, by providing onsite treatment of contaminated water, the mobile power washing system 100 may continue to operate at a power washing site without the need to resupply with supply/makeup water (e.g. clean water from a fire hydrant), thus enabling the mobile power washing system 100 to provide cost-effective, environmentally compliant, and efficient mobile power washing. In some embodiments, the water treatment unit 108 may be operably coupled to the at least one water tank 110 and/or the at least one water pump 114. In this regard, the water treatment unit 108 may treat contaminated water supplied from the mobile instant reclaim cleaning unit 126, the at least one water tank 110, and/or another source. Additionally or alternatively, once the water treatment unit 108 has treated the contaminated water and converted it to clean water, the clean water may be supplied to the at least one water tank 110 from the water treatment unit 108.

In some embodiments, the water treatment unit 108 may include a metering tank 202 in which contaminated water may be received into the water treatment unit 108. In some embodiments, the contaminated water may be stored in the metering tank 202 until the water treatment process is ready to begin. The metering tank 202 may include at least one sensor 232 for monitoring the volume of the contaminated water in the metering tank 202. In some embodiments, the water treatment process may begin once the at least one sensor 232 determines that a predetermined volume of contaminated water is in the metering tank 202. In some embodiments, an operator may be able to start the water treatment process at any time by using controller 140 (e.g. the operator may start the water treatment process before the at least one sensor 232 indicates that the metering tank 202 contains the predetermined volume of contaminated water). In some embodiments, the water treatment unit 108 may include filtration or dewatering media disposed at the entrance of the metering tank 202 and configured to capture large debris, trash, and/or the like that may be present in the contaminated water. In some embodiments, the filtration or dewatering media may be a first dewatering bag 234 comprising a woven or non-woven geotextile material. For example, the first dewatering bag 234 may comprise a synthetic polymer such as polypropylene, polyester, and/or polyethylene. In this regard, the first dewatering bag 234 may hold the large debris, trash, and/or the like that may be present in the contaminated water while allowing for the contaminated water to flow through the first dewatering bag 234 into the metering tank 202. While the use of the first dewatering bag 234 is discussed in detail herein, a person of ordinary skill in the art would understand that one or more of any suitable filtration or dewatering media may be used in addition or in the alternative, including, but not limited to, a filter press, centrifuge, belt press, and/or screw press.

In some embodiments, the water treatment unit 108 may include at least one flocculator 204 operably coupled to the metering tank 202. The at least one flocculator 204 may be configured for performing flocculation on the water being treated (e.g. causing particles in the contaminated water to group into larger aggregates). The at least one flocculator 204 may be any type of flocculator. For example, the at least one flocculator 204 may be a hydraulic flocculator or a mechanical flocculator. Although FIGS. 2-3 depict an embodiment in which the at least one flocculator 204 is used for performing flocculation, one skilled in the art in view of this disclosure will understand that other devices and methods (e.g. a mixing tank or a flash mixing tank) may be used for performing flocculation on the water being treated.

In some embodiments, the water treatment unit 108 may include a first dosing unit 214 and a second dosing unit 216 operably coupled to the at least one flocculator 204 and configured to inject one or more coagulants and/or one or more flocculants into the water being treated in the at least one flocculator 204 (e.g. causing particles in the contaminated water to group into larger aggregates). In some embodiments, the first dosing unit 214 may be configured to inject the one or more coagulants into the water being treated in the at least one flocculator 204. The one or more coagulants may be inorganic and/or organic positively charged molecules. For example, the one or more coagulants may comprise aluminum sulfate, aluminum chloride, sodium aluminate, ferric sulfate, ferrous sulfate, ferric chloride, ferric chloride sulfate, hydrated lime, magnesium carbonate, aluminum chlorohydrate, polyaluminum chloride, polyaluminum sulfate chloride, polyaluminum silicate chloride, polyaluminum chloride, polyferric sulfate, ferric salts, and/or polymerized aluminum-iron blends. In some embodiments, the second dosing unit 216 may be configured to inject the one or more flocculants into the water being treated in the at least one flocculator 204. For example, the one or more flocculants may comprise an anionic polymer flocculant, such as anionic polyacrylamide. In some embodiments, the one or more coagulants may be injected before the one or more flocculants. In some embodiments, the one or more flocculants may be injected before the one or more coagulants. In some embodiments, the one or more coagulants and the one or more flocculants may be injected at the same time. In some embodiments, the water treatment unit 108 may include one dosing unit configured to introduce the one or more coagulants and/or the one or more flocculants. In some embodiments, the first dosing unit 214 and the second dosing unit 216 may be configured to inject the one or more coagulants and/or one or more flocculants into the contaminated water before the contaminated water enters the at least one flocculator 204.

In some embodiments, the water treatment unit 108 may include an inclined plate clarifier 206 operably coupled to the at least one flocculator 204 and configured to separate particles from the water being treated. The inclined plate clarifier 206 may include one or more slanted plates 228 that provide a settling area for the particles in the water being treated. For example, the water being treated may enter the inclined plate clarifier 206 at the base of the one or more slanted plates 228 and flow upwards along the one or more slanted plates 228. As the water being treated flows upwards along the one or more slanted plates 228, the particles may begin slowly settling and come into contact with and begin to settle on the one or more slanted plates 228. The particles may then begin to slide downwards along the one or more slanted plates 228 towards the bottom of the inclined plate clarifier 206 while the water being treated continues upwards to where it may exit the inclined plate clarifier 206. At the bottom of inclined plate clarifier 206, the particles may coalesce to form sludge. Although FIGS. 2-3 depict an embodiment in which an inclined plate clarifier 206 is used, one skilled in the art in view of this disclosure will understand that any type of clarifier (e.g., horizontal flow, solids contact, circular solids contact clarifier, deep cone thickener/clarifier, parallel inclined plates, tube settler) may be used for facilitating the water treatment provided by the water treatment unit 108 by removing solid particulates and/or suspended solids from the contaminated water. Additionally, one skilled in the art in view of this disclosure will understand that additional or alternative components that facilitate gravity sedimentation (e.g. reducing the velocity of the water being treated and allowing the particles to be separated from the water being treated), such as a separator vessel, may be used for facilitating the water treatment provided by the water treatment unit 108 by removing solid particulates and/or suspended solids from the contaminated water. In addition or the alternative, a person of ordinary skill in the art in view of this disclosure will understand that one or more components that facilitate the movement of water dosed with coagulants and/or flocculants between a cathode and an anode such that the electrical charge increases the size of the particles to accelerate sedimentation (i.e. electrocoagulation) may be used for facilitating water treatment provided by the water treatment unit 108. Although not depicted in FIGS. 1-3, in some embodiments, a weir may be disposed at the top of the inclined plate clarifier 206.

With continued reference to FIGS. 1-3, in some embodiments the water treatment unit 108 may include a second dewatering bag 220 operably coupled to the inclined plate clarifier 206 and configured to receive sludge that has fallen from the inclined plate clarifier 206 and convert the sludge into dewatered sludge. In some embodiments, the second dewatering bag 220 may comprise a woven or non-woven geotextile material. For example, the second dewatering bag 220 may comprise a synthetic polymer such as polypropylene, polyester, and/or polyethylene. In this regard, the second dewatering bag 220 may hold the sludge while allowing for water present in the sludge to flow through the bag into a collection tank 230. While the use of the second dewatering bag 220 is discussed in detail herein, a person of ordinary skill in the art would understand that one or more of any suitable dewatering media may be used in addition or in the alternative, including, but not limited to, a filter press, centrifuge, belt press, and/or screw press. In some embodiments, the water in the collection tank 230 may then be supplied to the metering tank 202 where it may be reprocessed by the water treatment unit 108. For example, the water supplied to the metering tank 202 from the collection tank 230 may be processed with new contaminated water received by the water treatment unit 108. In some embodiments, once the water treatment process has finished the dewatered sludge may be removed from the water treatment unit 108 and disposed of (e.g. in a landfill).

In some embodiments, the water treatment unit 108 may include an absorbent media 224 operably coupled to the inclined plate clarifier 206. In some embodiments, the absorbent media 224 may be configured to absorb undissolved oil, grease, and/or the like present in the water being treated. As an example, the absorbent media 224 may comprise one or more absorbent materials, such as hydrophobic cellulose, sawdust, vermiculite, clay, polyurethane, polyethylene, and/or polypropylene. Although not shown in FIGS. 1-3, in some embodiments, the water treatment unit 108 may additionally or alternatively include an absorbent material disposed in, for example, the metering tank 202, the collection tank 230, the inclined plate clarifier 206 (e.g. at the top of the inclined plate clarifier 206), and/or othercomponents of the water treatment unit 108.

In some embodiments, the water treatment unit 108 may include a streaming current detector 208 operably coupled to the absorbent media 224 and configured to measure the electrical charge (e.g. zeta potential) and turbidity of the water being treated as it flows through the streaming current detector 208. The streaming current detector 208, however, may be positioned at one or more of any suitable locations within the water treatment unit 108 as understood by a person of ordinary skill in the art, including after the first filtration housing 210 and/or second filtration housing 212. In this regard, the streaming current detector 208 may include a piston or other means for moving the water being treated back and forth inside the streaming current detector 208, such that two electrodes, disposed within the streaming current detector 208, may measure the net ionic and surface charges of particles suspended in the water being treated. Additionally, in some embodiments, the streaming current detector 208 may include turbidity sensors configured to measure the amount of light that is scattered by particles suspended in the water being treated. In some embodiments, based on the electrical charge and turbidity measurements from the streaming current detector 208, the controller 140 may be configured to adjust the amount of coagulant and/or flocculant injected into the at least one flocculator 204 by the first dosing unit 214 and/or the second dosing unit 216.

In some embodiments, the water treatment unit 108 may include a first filtration housing 210 operably coupled to the streaming current detector 208 and a second filtration housing 212 operably coupled to the first filtration housing 210. The first filtration housing 210 and/or second filtration housing 212, however, may be positioned at one or more of any suitable locations within the water treatment unit 108 as understood by a person of ordinary skill in the art. In some embodiments, as illustrated in FIG. 2, there may be more than one of the first filtration housing 210 and more than one of the second filtration housing 212. A variety of filter media may be disposed inside the first filtration housing 210 and the second filtration housing 212. For example, the filter media may comprise filtration bags (e.g. polypropylene filtration bags and/or polyester filtration bags), wound filter cartridges, spun filter cartridges, melt-blown filter cartridges, pleated filter cartridges, filter baskets (e.g. stainless steel filter baskets) and/or carbon block filter cartridges. In some embodiments, a filter size of the filter media in the first filtration housing 210 may be larger than a filter size of the filter media in the second filtration housing 212 such that a two-staged filtration process may be performed on the water being treated. For example, the filter size of the filter media in the first filtration housing 210 may be in the range of 50 μm to 100 μm, and the filter size of the filter media in the second filtration housing 212 may be in the range of 5 μm to 25 μm. In further embodiments, the water treatment unit 108 may include a third filtration housing (not shown). In some embodiments, for example, the third filtration housing may comprise a grooved filter plate and/or wave washer; however, the third filtration housing may include any suitable filtration media as understood by a person of ordinary skill in the art.

In some embodiments, the water treatment unit 108 may include a pH monitor 222 operably coupled to the second filtration housing 212 and configured to monitor the pH of the water being treated. The pH monitor 222, however, may be positioned at one or more of any suitable locations within the water treatment unit 108 as understood by a person of ordinary skill in the art, including before the first filtration housing 210 and/or second filtration housing 212. In some embodiments, the water treatment unit 108 may include a third dosing unit 226 operably coupled to the pH monitor 222 and the at least one water tank 110. The third dosing unit 226, however, may be positioned at one or more of any suitable locations within the water treatment unit 108 as understood by a person of ordinary skill in the art, including before the first filtration housing 210 and/or second filtration housing 212. In some embodiments, if the pH monitor 222 determines that the pH of the water is not balanced, the third dosing unit 226 may be configured to balance the pH of the water, such that the pH is within an acceptable range (e.g. a pH between 6 and 8). For example, if the pH monitor 222 determines that the pH of the water is above the acceptable range, the third dosing unit 226 may inject an acidic solution into the water (e.g. vinegar) to reduce the pH of the water being treated to the acceptable range. As another example, if the pH monitor 222 determines that the pH of the water is below the acceptable range, the third dosing unit 226 may inject an alkaline solution into the water (e.g. baking soda) to increase the pH of the water being treated to the acceptable range. In some embodiments, the third dosing unit 226 may be additionally configured to disinfect the water being treated (e.g. to remove organic matter like bacteria) to control the chemical oxygen demand. For example, the third dosing unit 226 may inject one or more disinfectants into the water being treated (e.g. ozone) in order to convert the water being treated into clean water. In some embodiments, the clean water may then be supplied to the at least one water tank 110 to be reused in mobile power washing. Alternatively, the clean water may be disposed in a municipal drainage system or other governing bodies' drainage system, as the clean water meets varying environmental regulations.

In some embodiments, a crane 112 may be disposed on the drivable vehicle 104. The crane 112 may be configured to move components of the mobile power washing system 100. For example, the crane 112 may be configured to load and unload the at least one water tank 110 from the drivable vehicle 104. As another example, the crane 112 may be configured to unload and dispose of the dewatered sludge from the water treatment unit 108. As another example, the crane 112 may be configured to move the mobile instant reclaim cleaning unit 126 into position for mobile power washing or for transport.

Figure 4:
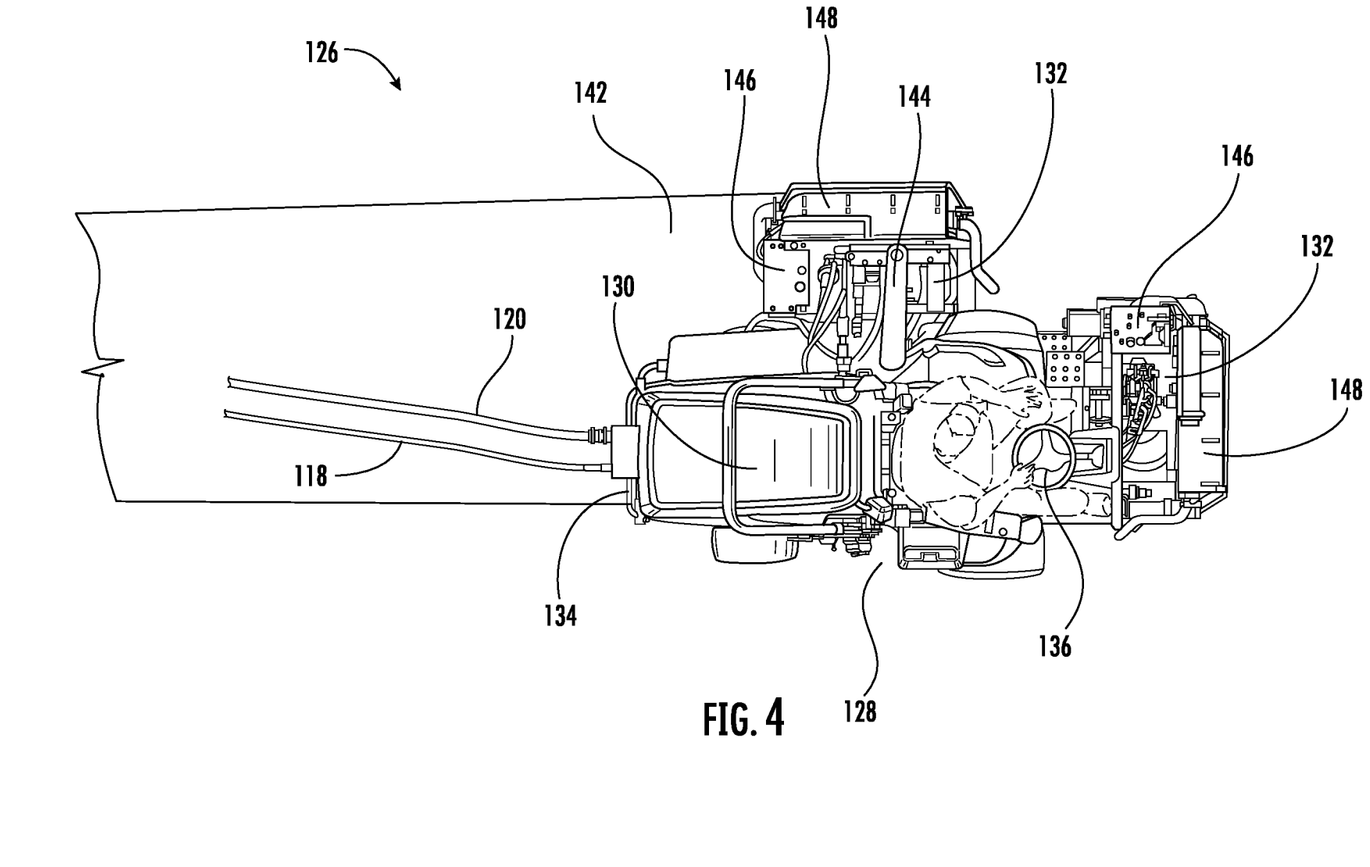
FIG. 4 illustrates a mobile instant reclaim cleaning unit in accordance with certain embodiments of the invention.
Figure 5:
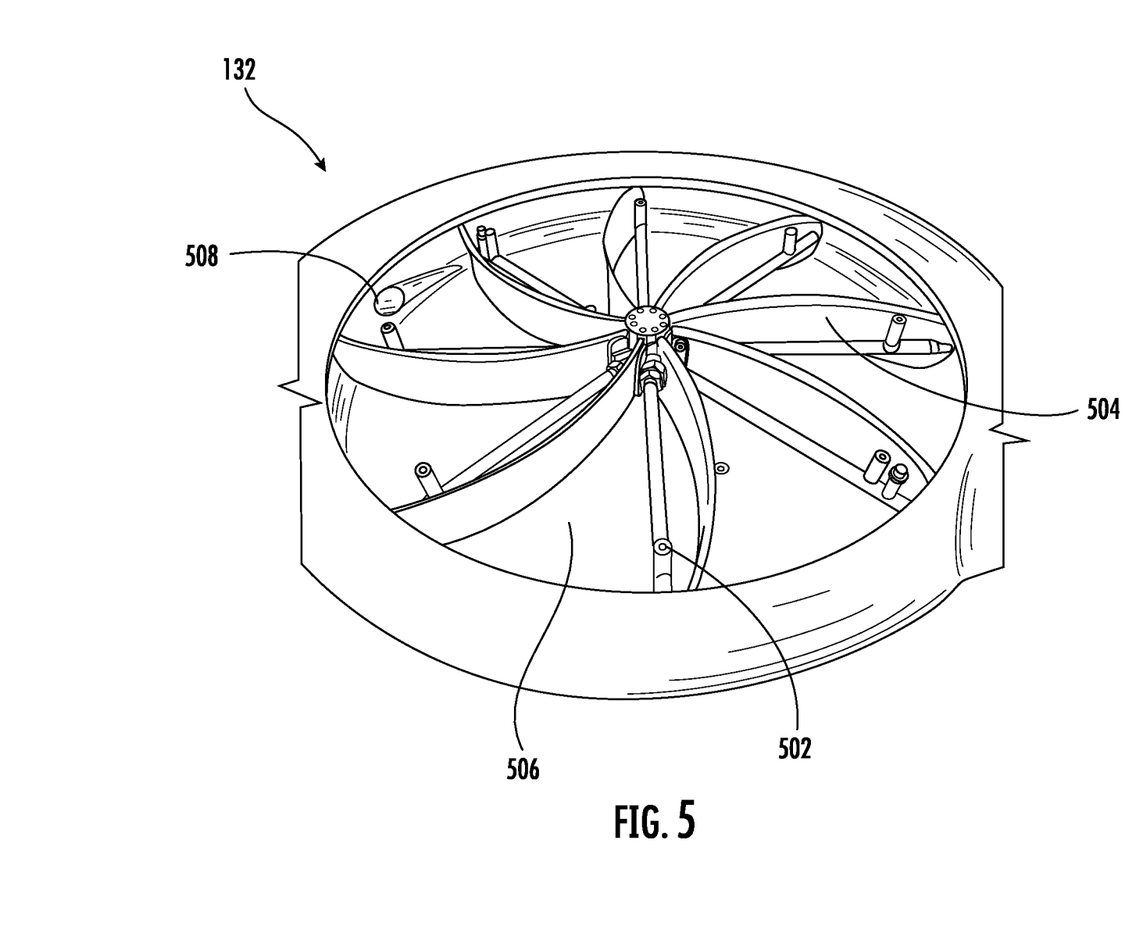
FIG. 5 illustrates a high pressure cleaning head in accordance with certain embodiments of the invention.

As illustrated in FIGS. 1, 4 and 5, the mobile power washing system 100 may include a mobile instant reclaim cleaning unit 126 configured for performing mobile power washing and reclaiming water used in mobile power washing. In some embodiments, a size of the mobile instant reclaim cleaning unit 126 may be smaller than a size of the mobile water treatment vehicle 102 such that the mobile instant reclaim cleaning unit 126 can provide mobile power washing in constrained areas. In some embodiments, the mobile instant reclaim cleaning unit 126 may be controlled by an operator positioned in an operator station 136. In some embodiments, the mobile instant reclaim cleaning unit 126 may be controlled by an operator at the mobile water treatment vehicle 102, for example, using the controller 140.

In some embodiments, the mobile instant reclaim cleaning unit 126 may include an instant reclaim drivable vehicle 128. In some embodiments, one or more high pressure cleaning heads 132 may be disposed on the instant reclaim drivable vehicle 128 and configured for performing mobile power washing on a surface 142. The mobile instant reclaim cleaning unit 126 may include one or more discharge pumps 146 disposed on the instant reclaim drivable vehicle 128. For example, the one or more discharge pumps 146 may be disposed on the instant reclaim drivable vehicle 128. In some embodiments, the mobile instant reclaim cleaning unit 126 may include a power source 130 (e.g. a diesel or gas generator) for generating electrical power, pneumatic power, mechanical power, and/or hydraulic power to provide power to the instant reclaim drivable vehicle 128, the one or more high pressure cleaning heads 132, and the one or more discharge pumps 146.

In some embodiments, the one or more high pressure cleaning heads 132 may include one or more spinning rotor arms 504 disposed in an interior space 506 of the one or more high pressure cleaning heads 132 and configured to generate negative pressure to lift dirt and reclaim water from the surface 142. Although not depicted in FIGS. 1, 4, and 5, in some embodiments, the one or more high pressure cleaning heads 132 may additionally or alternatively be connected to a pump (e.g. a shop vacuum) configured to generate negative pressure to lift dirt and reclaim water from the surface 142. In some embodiments, the one or more high pressure cleaning heads 132 may include one or more through holes 508 through which the lifted dirt and the reclaimed water may be evacuated from the interior space 506 of the one or more high pressure cleaning heads 132 (e.g. the lifted dirt and reclaimed water combine into contaminated water) via a centrifugal force and pneumatic conveyance from the air flow created by the one or more spinning rotor arms 504. In some embodiments, after exiting the interior space 506 via the one or more through holes 508, the contaminated water may flow into one or more holding tanks 148. In some embodiments, the contaminated water may then be supplied to the mobile water treatment vehicle 102 from the one or more holding tanks 148 by the one or more discharge pumps 146.

In some embodiments, the one or more high pressure cleaning heads 132 may include a plurality of nozzles 502 disposed in an interior space 506 of the one or more high pressure cleaning heads 132 and configured to deliver high pressure water (e.g. using hydraulic power) to the surface 142 for facilitating power washing of the surface 142. In some embodiments, the plurality of nozzles 502 may be coupled to the one or more spinning rotor arms 504 and configured to spin with the one or more spinning rotor arms 504. In some embodiments, the plurality of nozzles 502 may be static and not coupled to the one or more spinning rotor arms 504 (e.g. disposed above or below the one or more spinning rotor arms 504 in the interior space 506). The one or more high pressure cleaning heads 132 may be any shape capable of facilitating power washing (e.g. substantially circular or substantially rectangular). In some embodiments, at least one of the one or more high pressure cleaning heads 132 may include a moveable arm 144. The moveable arm 144 may be configured to lift the at least one of the one or more high pressure cleaning head 132 such that the at least one of the one or more high pressure cleaning head 132 may be flush against the instant reclaim drivable vehicle 128, thereby enabling the mobile instant reclaim cleaning unit 126 to fit in constrained areas and be easily transported. Although not depicted in FIGS. 1, 4, and 5, in some embodiments, the plurality of nozzles 502 may additionally or alternatively be disposed at an angle in the interior space 506 of the one or more high pressure cleaning heads 132 such that the plurality of nozzles 502 may be caused to spin when the one or more high pressure cleaning heads 132 are delivering high pressure water to the surface 142.

In some embodiments, the mobile instant reclaim cleaning unit 126 may be configured to be operably coupled to a high pressure water hose 118 and a reclaim hose 120. In some embodiments, the high pressure water hose 118 may be configured to provide clean water to the mobile instant reclaim cleaning unit 126 for cleaning. The high pressure water hose 118, by way of example only, may be a ¾ inch steel wire reinforced rubber coated hose configured to withstand at least 3000 Pounds Per Square Inch (PSI). In some embodiments, the reclaim hose 120 may be configured to remove contaminated water from the mobile instant reclaim cleaning unit 126 (e.g. using the one or more discharge pumps 146). The reclaim hose 120, by way of example only, may be 1½ inch rubber hose configured to withstand at least 150 PSI. In some embodiments, the mobile instant reclaim cleaning unit 126 may include piping 134. In some embodiments, the piping 134 may be operably coupled to the high pressure water hose 118 and the reclaim hose 120 as well as to the one or more high pressure cleaning heads 132 (e.g. via through hole 508) and the one or more discharge pumps 146. As such, the high pressure water hose 118 may be configured to provide clean water to the one or more high pressure cleaning heads 132 and the reclaim hose 120 may be configured remove contaminated water from the one or more high pressure cleaning heads 132.

As illustrated in FIG. 1, in some embodiments the mobile instant reclaim cleaning unit 126 may be operably coupled to the mobile water treatment vehicle 102 via the high pressure water hose 118 and the reclaim hose 120. In some embodiments, the high pressure water hose 118 may be coupled to the at least one water pump 114 disposed on the mobile water treatment vehicle 102 and the piping 134 disposed on the mobile instant reclaim cleaning unit 126. In this way, the at least one water pump 114 may be configured to pump clean water from the mobile water treatment vehicle 102 to the mobile instant reclaim cleaning unit 126 via the high pressure water hose 118 to enable the mobile instant reclaim cleaning unit 126 to perform mobile power washing. In some embodiments, the reclaim hose 120 may be coupled to the at least one water pump 114 disposed on the mobile water treatment vehicle 102 and the piping 134 and the one or more discharge pumps 146 disposed on the mobile instant reclaim cleaning unit 126. In this way, the one or more discharge pumps 146 pump contaminated water from the mobile instant reclaim cleaning unit 126 to the mobile water treatment vehicle 102 via the reclaim hose 120, such that the mobile water treatment vehicle 102 may treat the contaminated water.

In some embodiments, a controller 140 may disposed on the mobile water treatment vehicle 102. The controller 140 may be configured to control and view the operations of the mobile water treatment vehicle 102 and/or the mobile instant reclaim cleaning unit 126 either automatically or by an operator. For example, an operator may access the controller 140 to start the water treatment process. As another example, the controller 140 may automatically start the water treatment process when the at least one sensor 232 indicates that a predetermined amount of contaminated water is in the metering tank 202. As another example, an operator may access the controller 140 to monitor the water treatment process (e.g. view electrical charge, turbidity, pH, and the infection level of the water being treated). As another example, an operator may access the controller 140 to pump water between the mobile water treatment vehicle 102 and the mobile instant reclaim cleaning unit 126 and/or through the mobile water treatment vehicle 102.

Figure 6:
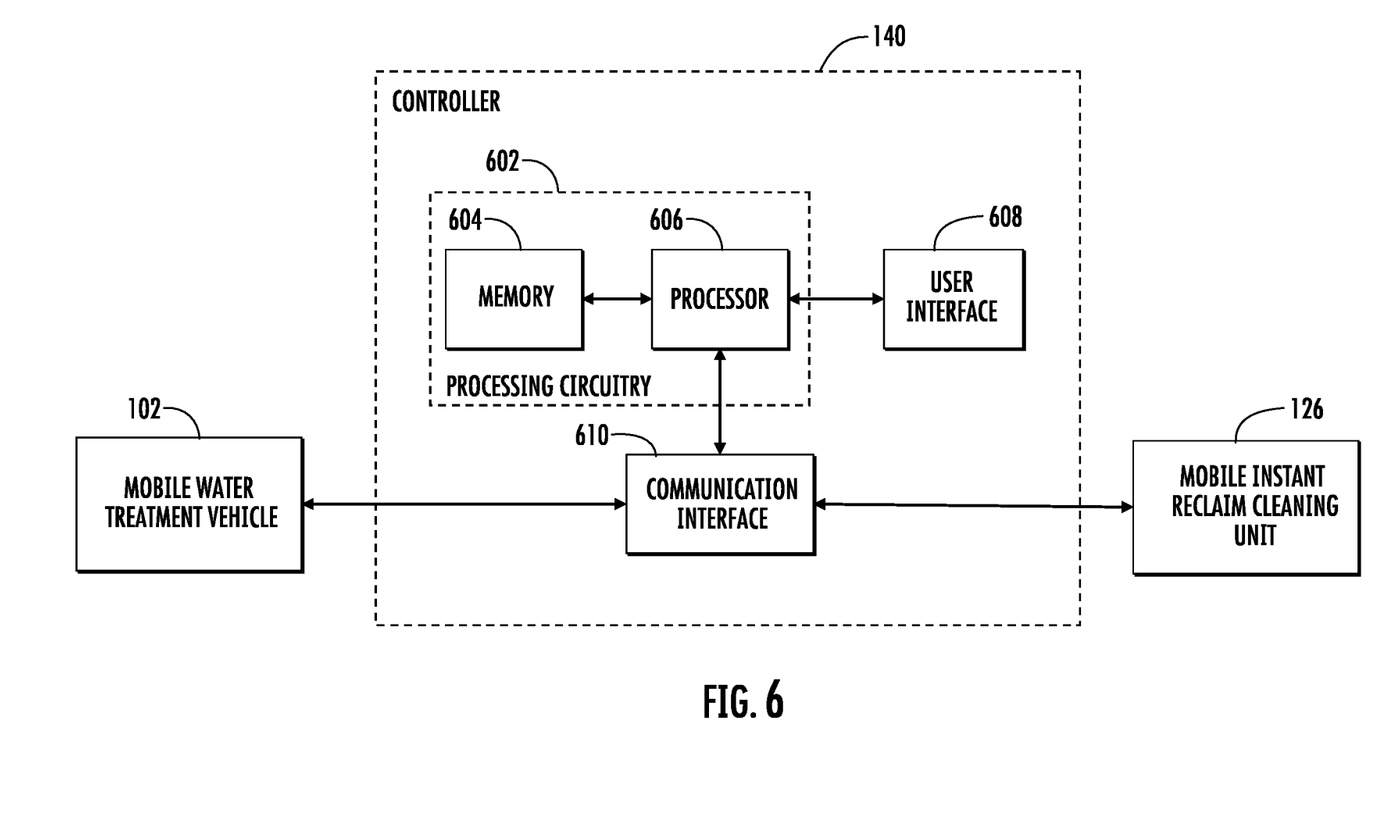
FIG. 6 illustrates a block diagram of a controller in accordance with one or more embodiments of the invention.

Referring now to FIG. 6, a block diagram of the controller 140 is illustrated. In some embodiments, the controller 140 may be a programmable logic controller (PLC). The controller 140 may include or otherwise be in communication with processing circuitry 602 that is configurable to perform actions in accordance with one or more embodiments disclosed herein. In this regard, the processing circuitry 602 may be configured to perform and/or control performance of one or more functionalities of the controller 140 in accordance with various embodiments, and thus may provide means for performing functionalities of the controller 140 in accordance with various embodiments. The processing circuitry 602 may be configured to perform data processing, application execution and/or other processing and management services according to one or more embodiments. In some embodiments, the controller 140 or a portion(s) or component(s) thereof, such as the processing circuitry 602, may be embodied as or comprise a chip or chip set. In other words, the controller 140 or the processing circuitry 602 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The controller 140 or the processing circuitry 602 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 602 may include a processor 606 and, in some embodiments, such as that illustrated in FIG. 6, may further include memory 604.

The processing circuitry 602 may be in communication with or otherwise control a user interface 608 and/or a communication interface 610. As such, the processing circuitry 602 may be embodied as a circuit chip (e.g., an integrated circuit chip) configured (e.g., with hardware, software or a combination of hardware and software) to perform operations described herein.

The processor 606 may be embodied in a number of different ways. For example, the processor 606 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 606 may comprise a plurality of processors. The plurality of processors may be in operative communication with each other and may be collectively configured to perform one or more functionalities of the controller 140 as described herein. In some embodiments, the processor 606 may be configured to execute instructions stored in the memory 604 or otherwise accessible to the processor 606. As such, whether configured by hardware or by a combination of hardware and software, the processor 606 may represent an entity (e.g., physically embodied in circuitry—in the form of processing circuitry 602) capable of performing operations according to embodiments of the present disclosure while configured accordingly. Thus, for example, when the processor 606 is embodied as an ASIC, FPGA or the like, the processor 606 may be specifically configured hardware for conducting the operations described herein. Alternatively, as another example, when the processor 606 is embodied as an executor of software instructions, the instructions may specifically configure the processor 606 to perform one or more operations described herein.

In some embodiments, the memory 604 may include one or more non-transitory memory devices such as, for example, volatile and/or non-volatile memory that may be either fixed or removable. In this regard, the memory 604 may comprise a non-transitory computer-readable storage medium. It will be appreciated that while the memory 604 is illustrated as a single memory, the memory 604 may comprise a plurality of memories. The memory 604 may be configured to store information, data, applications, instructions and/or the like for enabling the controller 140 to carry out various functions in accordance with one or more embodiments. For example, the memory 604 may be configured to buffer input data for processing by the processor 606. Additionally or alternatively, the memory 604 may be configured to store instructions for execution by the processor 606. As yet another alternative, the memory 604 may include one or more databases that may store a variety of files, contents or data sets. Among the contents of the memory 604, applications may be stored for execution by the processor 606 in order to carry out the functionality associated with each respective application. In some cases, the memory 604 may be in communication with one or more of the processor 606, user interface 608, and/or communication interface 610 via a bus(es) for passing information among components of the controller 140.

The user interface 608 may be in communication with the processing circuitry 602 to receive an indication of a user input at the user interface 608 and/or to provide an audible, visual, mechanical or other output to the user. As such, the user interface 608 may include, for example, a keyboard, a mouse, a joystick, a display, a touch screen display, a microphone, a speaker, and/or other input/output mechanisms. As such, the user interface 608 may, in some embodiments, provide means for a user to access and interact with the mobile water treatment vehicle 102 and/or the mobile instant reclaim cleaning unit 126 in accordance with various embodiments.

The communication interface 610 may include one or more interface mechanisms for enabling communication with other devices and/or networks. In some cases, the communication interface 610 may be any means such as a device or circuitry embodied in either hardware, or a combination of hardware and software that is configured to receive and/or transmit data from/to a network and/or any other device or module in communication with the processing circuitry 602. By way of example, the communication interface 610 may be configured to enable the controller 140 to communicate with the mobile water treatment vehicle 102 and/or the mobile instant reclaim cleaning unit 126. Accordingly, the communication interface 610 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

As a result, the mobile power washing system 100 enables mobile power washing in a cost effective and environmentally compliant manner. In particular, the mobile instant reclaim cleaning unit 126 is configured to perform mobile power washing on surfaces, including in constrained areas. The mobile instant reclaim cleaning unit 126 is further configured to reclaim the contaminated water generated by the mobile power washing so that the contaminated water does not runoff into a municipality's drainage system or other governing bodies' drainage system and impact the environment. Further, the mobile water treatment vehicle 102 is configured to supply the mobile instant reclaim cleaning unit 126 with clean water for performing mobile power washing and treat the contaminated water reclaimed by the mobile instant reclaim cleaning unit 126. As a result, the treated water may be reused for mobile power washing and/or directly disposed into a municipality's drainage system or other governing bodies' drainage system, thus, reducing the costs associated with mobile power washing of surfaces and preventing an impact to the environment.

Method of Onsite Water Treatment and Disposal

Figure 7:
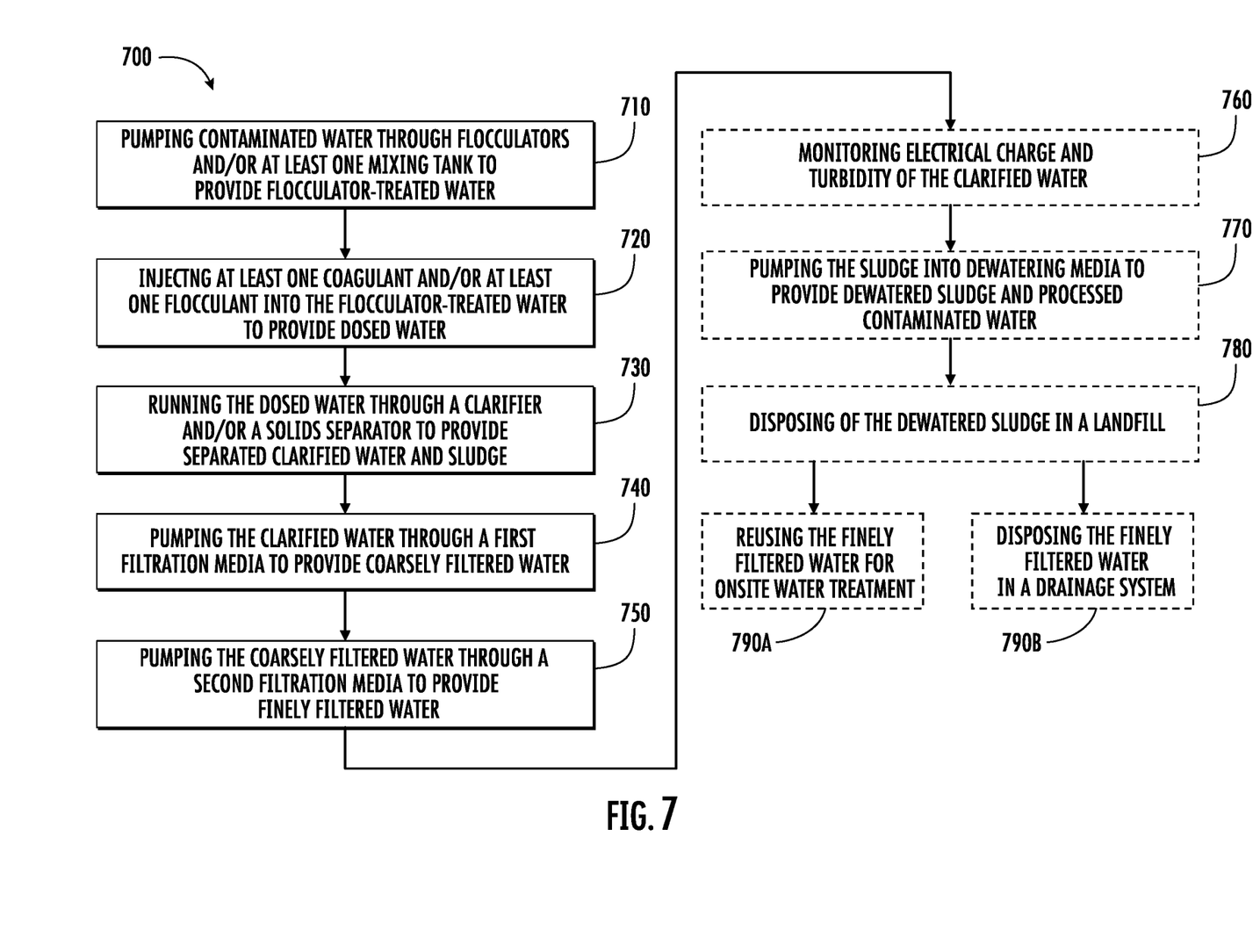
FIG. 7 is a block diagram of a method of onsite water treatment and disposal in accordance with certain embodiments of the invention.

Referring now to FIG. 7, FIG. 7 illustrates a flowchart according to a method 700 for providing onsite water treatment and disposal. As shown in block 710, the method 700 may begin with pumping contaminated water through flocculators to provide flocculator-treated water. As shown in block 720, the method 700 may continue with injecting one or more coagulants and/or one or more flocculants into the flocculator-treated water to provide dosed water. As shown in block 730, the method 700 may continue with running the dosed water through an inclined plate clarifier to provide separated clarified water and sludge. As shown in block 740, the method 700 may continue with pumping the clarified water through a first filtration bag to provide coarsely filtered water. As shown in block 750, the method 700 may continue with pumping the coarsely filtered water through a second filtration bag to provide finely filtered water. In some example implementations, a filter size of the first filtration bag may be larger than a filter size of the second filtration bag. As shown in block 760, the method 700 may optionally include monitoring electrical charge and turbidity of the clarified water. As shown in block 770, the method 700 may include pumping sludge into a dewatering bag to provide dewatered sludge and processed contaminated water. While the use of a dewatering bag is discussed herein, a person of ordinary skill in the art would understand that one or more of any suitable dewatering media may be used in addition or in the alternative, including, but not limited to, a filter press, centrifuge, belt press, and/or screw press. As shown in block 780, the method 700 may optionally include disposing of the dewatered sludge in a landfill. As shown in block 790, the method 700 may optionally include reusing the finely filtered water for onsite water treatment. As shown in block 795, the method 700 may optionally include disposing the finely filtered water in a sewer system.

As a result, the method 700 provides a cost effective and environmentally compliant method for onsite treatment of the contaminated water. In particular, the method has several steps that include dosing and flocculating the water being treated, clarifying the water being treated, filtering the water being treated, monitoring the electrical charge and turbidity of the water being treated, dewatering sludge generated during the water treatment process, and disposal of dewatered sludge. As a result, the treated water may be reused for mobile power washing and/or directly disposed into a municipality's drainage system or other governing bodies' drainage system, thus, reducing the costs associated with mobile power washing of surfaces and preventing an impact to the environment.

EXAMPLE

As a result of the above described systems and methods, it is possible to power wash surfaces and obtain treated water that meets standards for disposal in municipality or other governing bodies' drainage systems. Indeed, when subjected to routine testing, the systems and methods described herein achieve pollutant levels at or below the following maximums:

| Pollutant | Amount (mg/l) |
| --- | --- |
| Carbonaceous Biochemical Oxygen Demand (CBOD) | 250 |
| Chemical Oxygen Demand (COD) | 500 |
| Total Suspended Solids (TSS) | 250 |
| $NH_3$ | 25 |
| Ammonia as N | 20 |
| Arsenic | 0.003 |
| Cadmium | 0.003 |
| Chromium | 0.05 |
| Copper | 0.061 |
| Cyanide | 0.015 |
| Lead | 0.049 |
| Mercury | 0.0003 |
| Nickel | 0.021 |
| Silver | 0.005 |
| Total Petroleum Hydrocarbons | 100 |
| Zinc | 0.175 |

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile power washing system comprising:
   a mobile instant reclaim cleaning unit comprising:
   an instant reclaim drivable vehicle, and
   one or more high pressure cleaning heads disposed on the instant reclaim drivable vehicle;
   a mobile water treatment vehicle operably coupled to the mobile instant reclaim cleaning unit, the mobile water treatment vehicle comprising:
   a drivable vehicle,
   a water treatment unit disposed on the drivable vehicle,
   at least one water tank operably coupled to the water treatment unit and disposed on the drivable vehicle,
   at least one water pump disposed on the drivable vehicle and configured to pump water from the at least one water tank to the mobile instant reclaim cleaning unit, and
   a power source configured to power the at least one water pump; and
   a controller configured to control operation of the mobile instant reclaim cleaning unit and the mobile water treatment vehicle and communicate with the mobile instant reclaim cleaning unit and the mobile water treatment vehicle.

2. The mobile power washing system according to claim 1, wherein the mobile instant reclaim cleaning unit and the mobile water treatment vehicle are connected via a high pressure water hose and a reclaim hose, the high pressure water hose being configured to supply clean water from the at least one water tank of the mobile water treatment vehicle to the mobile instant reclaim cleaning unit for cleaning, and the reclaim hose being configured to supply contaminated water from the mobile instant reclaim cleaning unit to the at least one water tank of the mobile water treatment vehicle after cleaning.

3. The mobile power washing system according to claim 1, wherein each of the one or more high pressure cleaning heads comprises:
   a plurality of nozzles configured to deliver high pressure water to a surface; and
   one or more spinning rotor arms configured to generate negative pressure to lift dirt and reclaim water from the surface.

4. The mobile power washing system according to claim 1, wherein the drivable vehicle of the mobile water treatment vehicle comprises a transport chassis.

5. The mobile power washing system according to claim 1, wherein the water treatment unit comprises:
   at least one flocculator;
   a dosing unit operably coupled to the flocculator, wherein the dosing unit is configured to inject one or more coagulants and/or one or more flocculants into water being treated in the at least one flocculator;
   a clarifier and/or a solids separator vessel operably coupled to the at least one flocculator;
   a streaming current detector operably coupled to the clarifier and/or the solids separator vessel; and
   at least a first filtration media and a second filtration media, wherein the first filtration media is operably coupled to the streaming current detector, the second filtration media is operably coupled to the first filtration media and the at least one water tank, and a filter size of the first filtration media is larger than a filter size of the second filtration media.

6. The mobile power washing system according to claim 5, wherein the water treatment unit further comprises dewatering media operably coupled to the clarifier and/or the solids separator vessel, the dewatering media being configured to process sludge pumped from the clarifier and/or the solids separator vessel.

7. The mobile power washing system according to claim 1, wherein the power source comprises a source of electrical power, pneumatic power, hydraulic power, or any combination thereof and optionally comprising a powertrain system of the drivable vehicle of the mobile water treatment vehicle.

8. The mobile power washing system according to claim 1, wherein the controller comprises a programmable logic controller (PLC).

\* \* \* \* \*